(12) United States Patent  
Baumbarger

(10) Patent No.: US 8,196,911 B2  
(45) Date of Patent: Jun. 12, 2012

(54) ADJUSTABLE RATE SUBFRAME MOUNT

(75) Inventor: Michael A. Baumbarger, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 12/258,789

(22) Filed: Oct. 27, 2008

(65) Prior Publication Data

US 2010/0102595 A1    Apr. 29, 2010

(51) Int. Cl.  
*F16M 7/00* (2006.01)
(52) U.S. Cl. .................................. 267/141.2; 267/293
(58) Field of Classification Search ............ 267/140.12, 267/140.3–140.5, 141.1–141.2, 276, 277, 267/279, 281, 282; 248/562
See application file for complete search history.

(56) References Cited

U.S. PATENT DOCUMENTS

| 1,734,596 | A | * | 11/1929 | Rosenzweig | ............... 267/140.2 |
| 2,051,864 | A | * | 8/1936 | Knox et al. | ..................... 267/282 |
| 2,684,819 | A | * | 7/1954 | Moyer et al. | ................... 248/556 |
| 2,819,060 | A | * | 1/1958 | Neidhart | ......................... 267/153 |
| 2,958,526 | A | * | 11/1960 | Jurgen et al. | .................. 267/292 |
| 3,625,501 | A | | 12/1971 | Hein et al. | |
| 3,730,462 | A | | 5/1973 | Dick | |
| 5,031,885 | A | * | 7/1991 | Schwerdt | ..................... 267/141.2 |
| 5,096,166 | A | * | 3/1992 | Schwerdt | .................. 267/140.12 |
| 6,641,119 | B2 | | 11/2003 | Kato | |
| 6,845,994 | B2 | * | 1/2005 | Cai et al. | ................. 280/124.107 |
| 7,137,634 | B2 | | 11/2006 | Oh | |
| 2002/0014731 | A1 | * | 2/2002 | Palinkas | .......................... 267/276 |
| 2002/0113349 | A1 | * | 8/2002 | Rivin | ........................... 267/140.2 |
| 2005/0116403 | A1 | * | 6/2005 | Wellman | ....................... 267/279 |
| 2006/0076721 | A1 | * | 4/2006 | Bouhier et al. | ............. 267/141.2 |
| 2006/0108727 | A1 | * | 5/2006 | Hees | ........................... 267/141.2 |
| 2006/0151929 | A1 | | 7/2006 | Franck et al. | |
| 2006/0231993 | A1 | | 10/2006 | Collyer et al. | |

FOREIGN PATENT DOCUMENTS

| JP | 58106237 | 6/1983 |
| JP | 62028537 | 2/1987 |
| JP | 2256933 | 10/1990 |

* cited by examiner

*Primary Examiner* — Christopher Schwartz  
(74) *Attorney, Agent, or Firm* — Plumsea Law Group, LLC; Mark E. Duell

(57) ABSTRACT

A subframe mount capable of having its rate adjusted is disclosed. Subframe mount is configured with damping regions configured to removably receive inserts that would modify rate upon insertion. In this configuration, subframe mount may have its rate adjusted without removal from the motor vehicle. In certain configurations, the subframe mount provides the ability to tune the rate in multiple directions, providing an enhanced motor vehicle development tool.

23 Claims, 11 Drawing Sheets

ADJUSTABLE RATE SUBFRAME MOUNT

BACKGROUND OF THE INVENTION

1. Field of the Invention

This invention relates to subframe mounts, and in particular a subframe mount capable of rate adjustment without removing the mount from the subframe.

2. Description of Related Art

Motor vehicles are generally constructed with a unibody frame that serves, among other things, to support the engine. Many motor vehicle designs today also include a subframe assembly attached to the unibody. The subframe assembly provides additional support to the engine, which may be mounted on unibody in the vicinity of the subframe. Generally, a mounting provision, usually in the form of a subframe mount, is disposed between the unibody and the subframe. These mounts typically provide a mechanical buffer between the unibody and the subframe.

A primary function of subframe mounts is to dampen vibrations between the subframe and the unibody. This damping is desirable to prevent vibrational damage to the subframe and to inhibit the transfer of vibrations to the passenger compartment. Vibrations may be caused by engine operation or uneven road surfaces. Typically, damping can be achieved by constructing the subframe mounts from an elastomeric material, which provides some degree of compliance to the mounts. The degree of compliance, or stiffness, of the subframe mount will govern what frequencies of vibrations the subframe mount can dampen.

Generally, the stiffness of the subframe mount is called the rate. During motor vehicle development, the subframe mount rate needs to be adjusted or tuned to optimize the damping effect. Typically this is performed by constructing many different subframe mounts having varying rates and testing those mounts on a vehicle until the optimal rate is achieved. Since testing typically occurs with an assembled motor vehicle, changing a mount with an undesirable rate typically requires removing the engine, removing the subframe from the unibody, removing the mount, replacing the mount with a new mount having a different rate, and replacing the engine. Each of these steps is a laborious process, leading to long development time for optimizing the subframe mount.

Adjustable rate subframe mounts are generally known in the art, typically to enable a motor vehicle to select a rate during operation of the vehicle. For example, U.S. Pat. No. 3,730,462 to Dick, teaches a tunable subframe mount assembly. The subframe mount assembly in the Dick design includes an inner cylindrical bushing and an outer cylindrical bushing. The outer cylindrical bushing is shaped like a cage, including a pair of axially spaced bars and a pair of axially extending bars positioned on opposite sides of the cylinder of the outer bushing. Concentric layers of metal cages having a similar shape as the outer bushing and separated by resilient bodies are disposed between the bushings, and the resilient material is positioned only between the axially extending portions.

For the Dick design, the subframe mount assembly is most stiff in the vicinity of the axially extending bars. The varying rates of the subframe mount are fixed within the mount, and stiffness tuning is available only by changing the orientation of the subframe mount. This design does not provide for modifying the rate of the subframe mount without modifying the orientation of the subframe mount. In other words, in order to change the rate, the subframe mount would have to be removed from the subframe and re-oriented.

In an alternate approach, Japanese Publication Number JP58106237 to Yoshida teaches a subframe mount having adjustable vibration damping characteristics. The subframe mount includes a metal frame containing a hollow shaft centrally disposed within the metal frame. An elastic member is disposed between the hollow shaft and the metal frame. Two hollow parts or voids are formed within the elastic member on opposite sides of the hollow shaft so that the spring constant of an axis passing through the hollow parts is reduced. A worm is engaged with a worm wheel that is fixedly attached to the metal frame. This worm gear is configured to rotate the metal frame so that the hollow parts may be positioned at different orientations so that the axis of reduced spring constant may be changed depending upon the driving conditions (for example, idling versus normal driving).

In the Yoshida design, the stiffness tuning is achieved by virtue of a worm gear rotating the mount, so that re-orienting the hollow parts with respect to the frame repositions the axis having the lowest spring constant. The selection of the orientation is altered during use of the mount.

Therefore, a need exists in the art for a subframe mount capable of having its rate adjusted without removing the mount from the motor vehicle to adjust the rate or re-orienting the mount.

SUMMARY OF THE INVENTION

A subframe mount capable of rate adjustment without disengaging the subframe mount from the subframe is disclosed. The subframe mount generally includes a housing into which an insert having a known rate may be removably inserted. The insert is generally selected from a group of possible inserts of different rates.

In one aspect, the invention provides subframe mount having a rate, the subframe mount comprising a housing and at least one compartment provided in the housing, wherein the housing is configured to adjust the rate of the subframe mount by selecting a removable insert having a first rate from a group of inserts having different rates and positioning the removable insert in the compartment.

In another aspect, the removable insert comprises a damping material.

In another aspect, the removable insert comprises a frame disposed on an exterior of a portion of the damping material.

In another aspect, the removable insert comprises a single damping material.

In another aspect, the removable insert comprises multiple damping materials.

In another aspect, the multiple damping materials are separated by a plate.

In another aspect, the invention provides a method of optimizing a subframe mount rate, the method comprising: providing a subframe mount system comprising a housing and a group of inserts of various stiffnesses, wherein the housing is configured to removably receive at least one of the group of inserts of various stiffnesses; associating the housing with a subframe of a motor vehicle; selecting a first insert from the group of inserts, the first insert having a first stiffness; positioning the first insert within the housing to form a first assembled subframe mount; associating the first assembled subframe mount to a motor vehicle frame; and testing the damping effect of the first assembled subframe mount.

In another aspect, the method further comprises the step of removably securing the first insert to the housing.

In another aspect, the method further comprises the steps of detaching the motor vehicle frame from the first assembled subframe mount; removing the first insert from the housing;

selecting a second insert from the group of inserts, the second insert having a second stiffness; positioning the second insert within the housing to form a second assembled subframe mount; attaching the motor vehicle frame to the second assembled subframe mount; and testing the damping effect of the second assembled subframe mount.

In another aspect, the method further comprises the step of securing the second insert within the housing.

In another aspect, the housing is configured to receive at least two inserts along a single axis, and the group of inserts comprises a plurality of pairs of inserts of various stiffnesses, wherein both inserts of each pair have the same stiffness.

In another aspect, the invention provides a subframe mounting system for determining the optimal rate of a subframe mount for a motor vehicle, the system comprising: a housing made of a rigid material; the housing including at least one compartment for removably receiving an insert; a group of inserts, where each insert of the group of inserts has a unique stiffness; wherein the stiffness of the housing may be altered by selecting an insert from the group of inserts and positioning the selected insert within the compartment.

In another aspect, the housing is configured to receive at least two inserts along a single axis.

In another aspect, the group of inserts comprises a plurality of pairs of inserts, wherein each insert in the pair has the same rate.

In another aspect, each insert comprises a damping material.

In another aspect, the damping material comprises an elastomeric material.

In another aspect, the insert comprises at least two different damping materials, wherein each damping material has a different stiffness.

In another aspect, a plate separates the different damping materials.

In another aspect, the damping material is associated with a frame.

In another aspect, the insert is configured to be secured within the compartment.

In another aspect, the invention provides a kit for testing the rate of a subframe mount comprising a plurality of interchangeable inserts configured to be received within a housing of a subframe mount, wherein a first insert of the plurality of interchangeable inserts has a first stiffness and a second insert of the plurality of interchangeable inserts has a second stiffness.

In another aspect, the plurality of interchangeable inserts includes at least one pair of inserts having substantially the same stiffness.

In another aspect, each insert comprises a damping material.

In another aspect, the damping material comprises an elastomeric material.

In another aspect, the damping material is associated with a frame.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the invention is directed toward a subframe mount disposed between and associated with the subframe and the frame of a motor vehicle. The subframe mount is configured to allow the user to alter the rate of the subframe mount while at least a portion of the subframe mount remains attached to the subframe. The subframe mount includes provisions so any one of a group of inserts may be positioned within the mount, where each insert or pair of inserts has a different stiffness. Changing the insert or inserts within the mount alters the stiffness of the mount along at least one axis.

Figure 1:
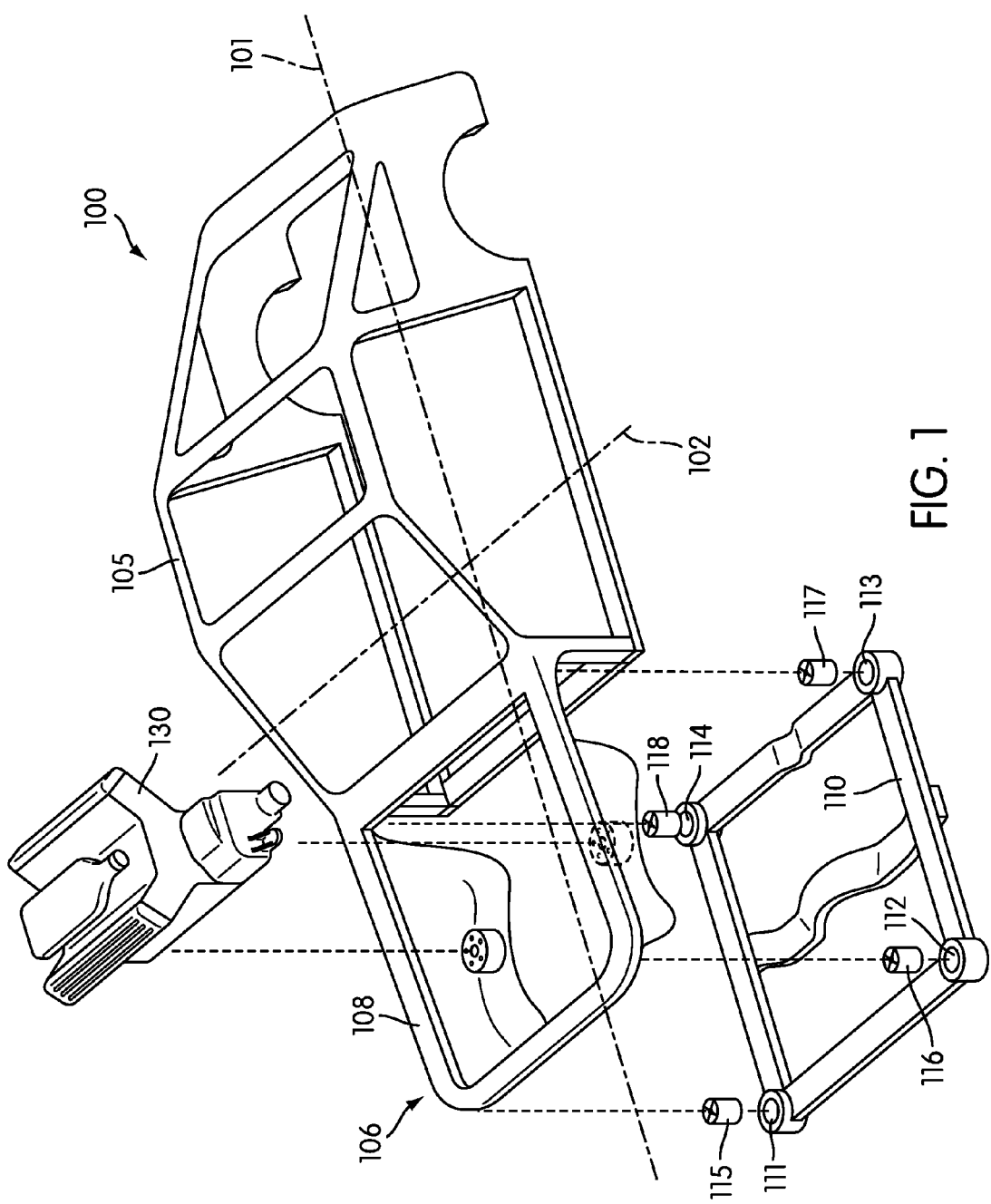
FIG. 1 is an exploded isometric view of a motor vehicle unibody, the engine, and the subframe.

Referring to FIG. 1, a motor vehicle 100 is provided. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some embodiments, including the embodiment shown in the figures, motor vehicle 100 includes a frame 105. Frame 105 may be any type of frame known in the art. In the embodiment shown in the figures, frame 105 includes a unibody, which generally includes the chassis of motor vehicle 100 and the body of motor vehicle 100 as a single unit. In other embodiments, frame 105 may include a separate chassis and body. For reference, frame 105 has a longitudinal axis 101 and a transverse axis 102. Longitudinal axis 101 may be the same for frame 105 and motor vehicle 100. Additionally, transverse axis 102 is the same for frame 105 and motor vehicle 100.

In some embodiments, frame 105 includes an engine compartment 106. Generally, engine compartment 106 is configured to receive an engine 130. In some embodiments, a subframe 110 may be disposed in or near engine compartment 106 to supply additional support to an engine compartment frame 108, which may be a portion of frame 105. The shape of subframe 110 may vary depending upon the type of motor vehicle, the type of engine, the type of drivetrain, or other factors. Typically, a subframe is substantially rectangular in shape, having two spaced apart members extending substantially parallel to transverse axis 102 and two spaced apart members extending substantially parallel to longitudinal axis 101. In some embodiments, additional structural supports may be provided on any or all of the members to reduce vibrations. Further, in some embodiments, any of all of the members may include curved portions and/or bends, for example, to accommodate drivetrain elements or to conform to the contours of the unibody. In the embodiment shown in the figures, subframe 110 includes two members extending substantially parallel to longitudinal axis 101. A first transverse member extends parallel to transverse axis 102 to connect the longitudinal members at or near a front of motor vehicle 100. A second transverse member extends substantially parallel to transverse axis 102 to connect the longitudinal members at or near a rear end of motor vehicle 100. A third transverse member extends across subframe 110 at or near a center of subframe 110. The third transverse member is configured to extend beneath engine 130.

Generally, frame 105 includes at least one provision to mount or receive an engine. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Engines typically include mounting provisions configured to removably attach the engine to the motor vehicle, although in some embodiments, an engine may be fixedly attached to the motor vehicle, such as by welding. When engine mounts are provided, such provisions typically include bolt holes and flanges configured to receive bolts or other mechanical fasteners mechanically linking the engine to the subframe mount. Any fastening system known in the art may be used as long as both the engine and the engine mount are configured to engage with each other using the selected system.

Frame 105 may not be attached directly to subframe 110, as such a configuration could yield undesirable vibrations in the passenger compartment. Vibrations occur between the engine and the subframe during operation, typically due to normal engine operation and uneven road surfaces. Subframe mounts are typically constructed such that the subframe mounts may dampen the vibrations between the engine and subframe during motor vehicle operation. Therefore, subframe 110 includes at least one provision to attach subframe 110 to frame 105, although in many embodiments multiple receiving provisions are included.

Figure 4:
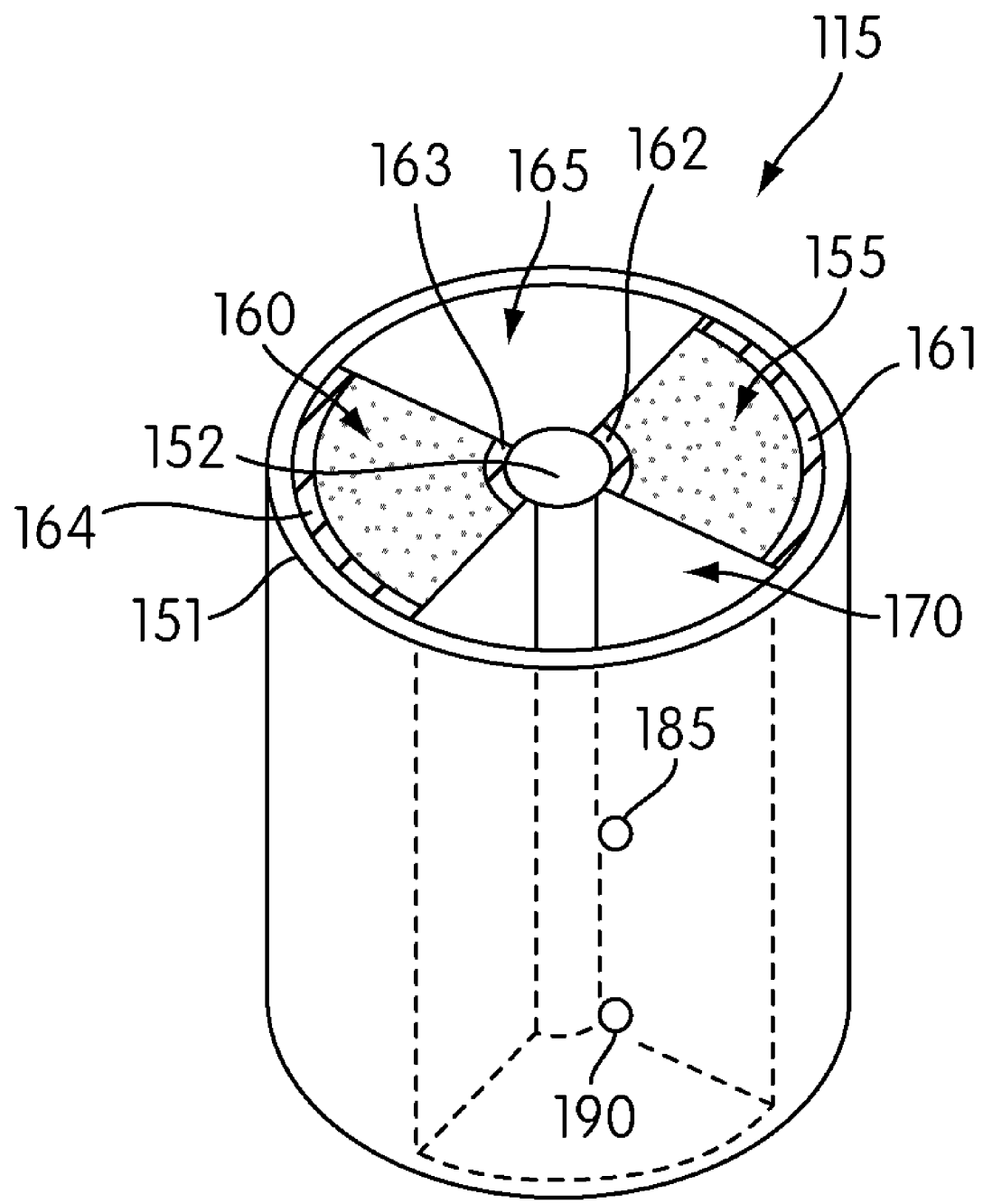
FIG. 4 an isometric view of an embodiment of an adjustable rate subframe mount with no damping inserts disposed in receiving portions.

The placement and number of the subframe mounts may vary, depending upon the type of motor vehicle, the type of engine, the shape of the subframe, and other factors. In the embodiment shown in the figures, four subframe mounts are provided, one at each corner of subframe 110: a first subframe mount 115, a second subframe mount 116, a third subframe mount 117, and a fourth subframe mount 118. Subframe mounts 115, 116, 117, and 118 may be removably attachable to subframe 110, although in some embodiments at least a portion of subframe mounts 115, 116, 117, and 118 may be fixedly attached to subframe 110. For example, as shown in FIG. 4, subframe mount 115 generally includes a housing 151 having compartments 165, 170 configured to receive removable inserts (not shown in FIG. 4). Housing 151 may be configured to be press-fitted or welded to a subframe member, as the interchangeability of the inserts allows the performance characteristics of subframe 110 to be altered without removing the entirety of subframe 110 from subframe member 115. Housing 151 may be made of a rigid and durable material, such as metals like steel and aluminum, composite materials, or the like.

In some embodiments, subframe 110 includes mount receiving portions configured so that subframe mounts 115, 116, 117, and 118 may be associated with subframe 110 at the mount receiving portions. As shown in FIG. 1, subframe 110 is provided with four mount receiving portions: a first mount receiving portion 111 configured to receive first subframe mount 115, a second mount receiving portion 112 configured to receive second subframe mount 116, a third mount receiving portion 113 configured to receive third subframe mount 117, and a fourth mount receiving portion 114 configured to receive fourth subframe mount 118. In some embodiments, subframe 110 may include the same number of mount receiving portions as subframe mounts. In other embodiments, the number of mount receiving portions may be greater than the number of mounts intended to be used so that the locations of the subframe mounts may be changed. In some embodiments all mount receiving portions may be identically sized and shaped, while in other embodiments, each mount receiving portion may have a unique size and/or shape so that certain subframe mounts will only fit specific mount receiving portions.

In the embodiment shown in the figures, mount receiving portions 111, 112, 113, and 114 are configured so that subframe mounts 115, 116, 117, and 118 may be inserted into mount receiving portions 111, 112, 113, and 114. Subframe mounts 115, 116, 117, and 118 may be fitted into mount receiving portions 111, 112, 113, and 114 using any method known in the art, such as by press-fitting, sliding with keyed elements, or the like. Subframe mounts 115, 116, 117, and 118 may be secured within mount receiving portions 111, 112, 113, and 114. The securing of subframe mounts 115, 116, 117, and 118 may be achieved using any method known in the art, such as by an interference fit, using mechanical fasteners such as screws, bolts, or the like, by welding, or with a combination of securing elements.

Figure 2:
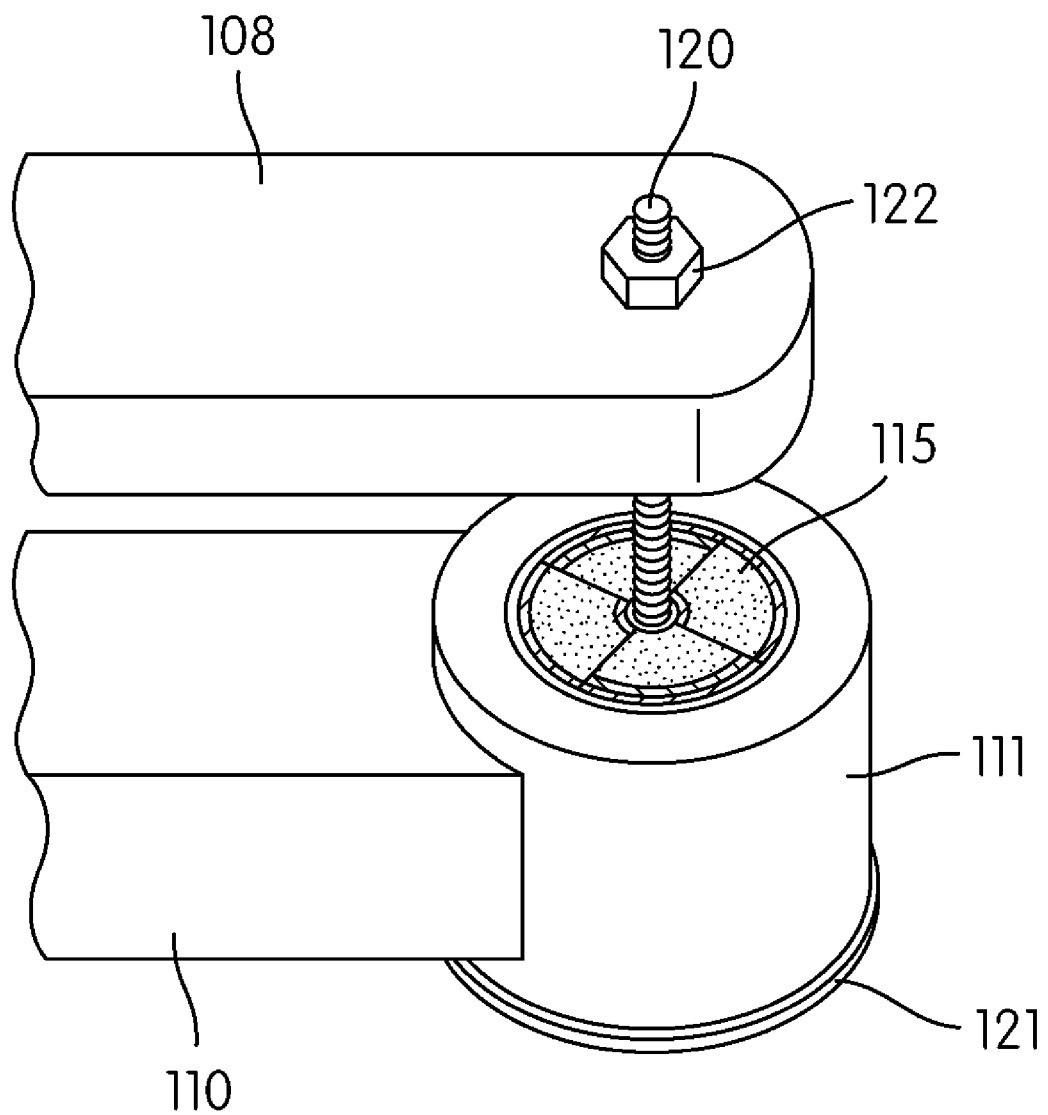
FIG. 2 is an isometric view of a portion of a unibody mounted to a portion of a subframe.
Figure 3:
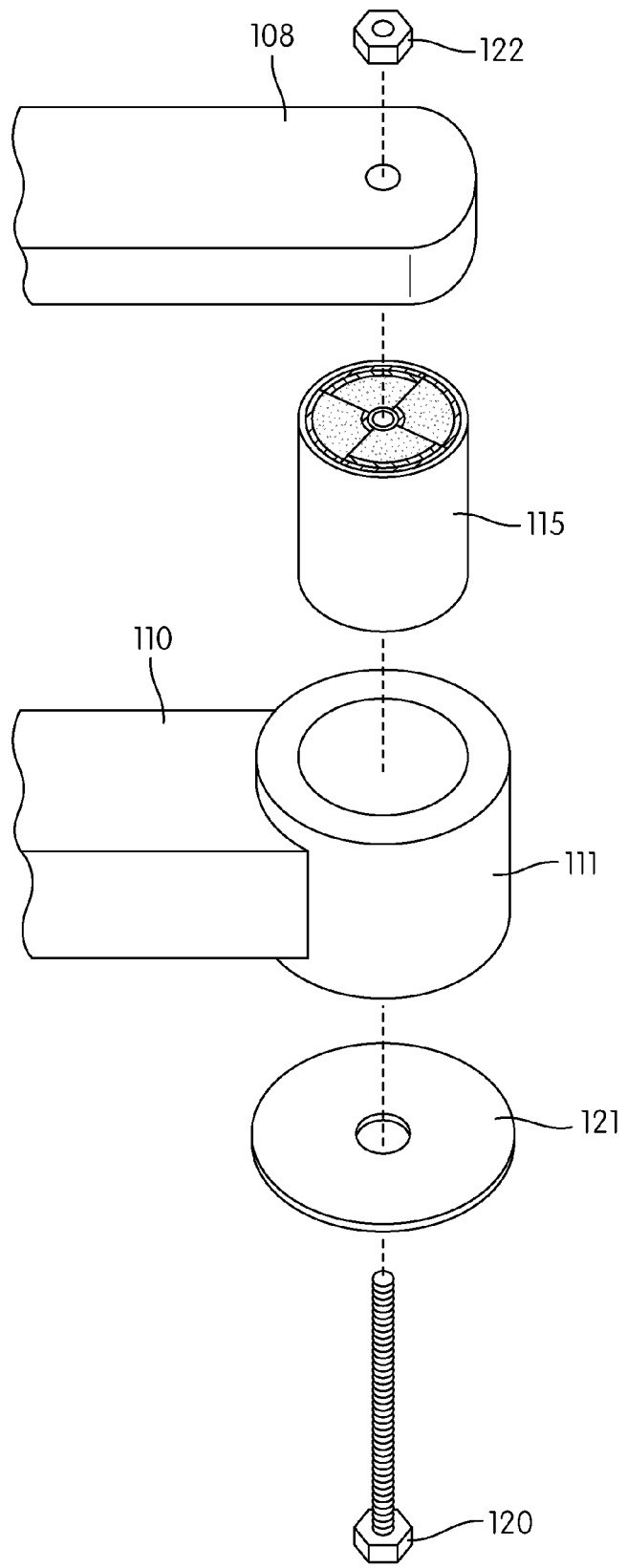
FIG. 3 is an exploded view of the unibody a subframe mount of FIG. 2.

As shown in FIGS. 2-3, subframe mount 115 includes provisions to allow subframe mount 115 to be securely associated with subframe 110 and with engine compartment frame 108. Subframe mount 115 may be sized and shaped to be fitted into mount receiving portion 111, such as by press-fitting. A mechanical fastener such as bolt 120 may be inserted through subframe mount 115 and engine compartment frame 108. In other embodiments, other mechanical fasteners may be used, such as pins, screws, or the like. A nut 122 configured to be threaded onto a threaded portion of bolt 120 may be provided to secure bolt 120 into position so that subframe 110, subframe mount 115, and engine compartment frame 108 are secured together. In some embodiments, a washer 121 may be provided below mount receiving portion 111 so that the head of bolt 120 may come into contact with washer 121 and not slip against mount receiving portion 111 or the lower surface of subframe mount 115. In other embodiments, the orientation of the mechanical fastener may be reversed, so that the head of bolt 120 may be positioned above engine compartment frame 108 and nut 121 may be positioned beneath optional washer 121.

The ability of subframe mounts to dampen the vibrations relates to the stiffness of the subframe mount. Generally, the stiffness of the subframe mount resists or absorbs the engine vibrations. A subframe mount may be designed to have different stiffnesses along different axes, so that the damping effect may be slightly or substantially different in those different directions. Such configurations may be warranted if testing reveals different levels of vibrations along the different axes.

To provide damping capability, subframe mounts are commonly comprised of any spring-like material commonly known in the art, such as elastomeric materials like rubber. Alternatively, subframe mounts may be comprised of any dashpot-like material known in the art. The resultant stiffness of the subframe mount is termed the rate of the mount. The subframe mount rate may be optimized or tuned to provide the most effective damping of the vibrations.

Subframe mount rate tuning generally occurs during the design process of the motor vehicle. During a typical design process, subframe mounts having a known rate are attached to the subframe and the frame. The engine is then attached to the frame via engine mounts. The engine is then operated, and the vibrations of the subframe are measured. If the rate of the subframe mount is sub-optimal, i.e., if the rate is too high or too low, then the engine, subframe, and subframe mounts are detached. New subframe mounts having a different rate than the already-tested subframe mounts are selected and attached to the subframe. The engine is re-attached to the frame, and the engine is operated for additional vibration tests. Engine removal and replacement and subframe mount removal and replacement are time consuming and laborious processes, and subframe mount optimization may require several iterations before the optimal rate is identified. This leads to a lengthy process for subframe mount rate optimization.

In order to reduce the required time to obtain rate optimization, the rate of subframe mounts 115, 116, 117, and 118 may be altered without removing at least a portion of subframe mounts 115, 116, 117, and 118 from subframe 110. This is achieved generally by providing a group of interchangeable inserts configured to be positioned within the housing of subframe mounts 115, 116, 117, and 118, where each insert or subgrouping of inserts has a unique stiffness. A user may select an insert or plurality of inserts to be received within a housing depending upon the desired stiffness characteristics.

Figure 5:
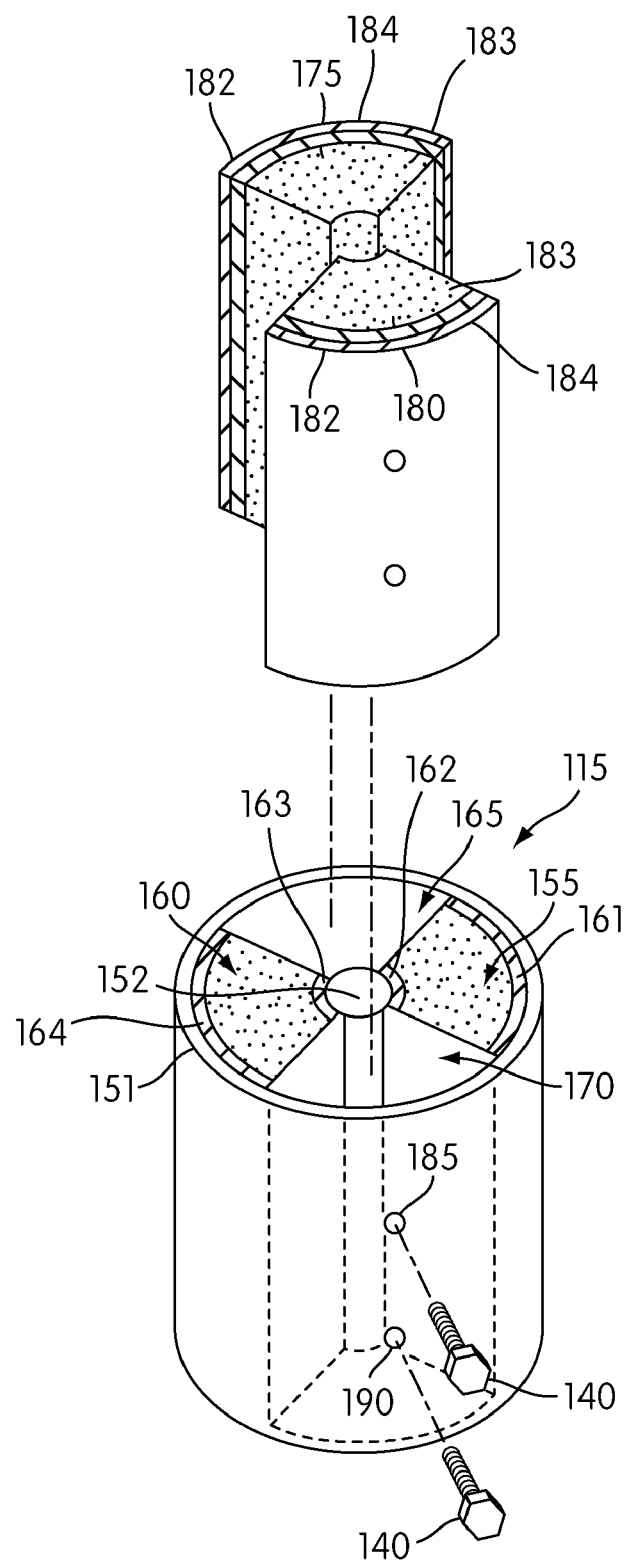
FIG. 5 is an exploded, isometric view of an embodiment of an adjustable rate subframe mount with a pair of damping inserts.
Figure 6:
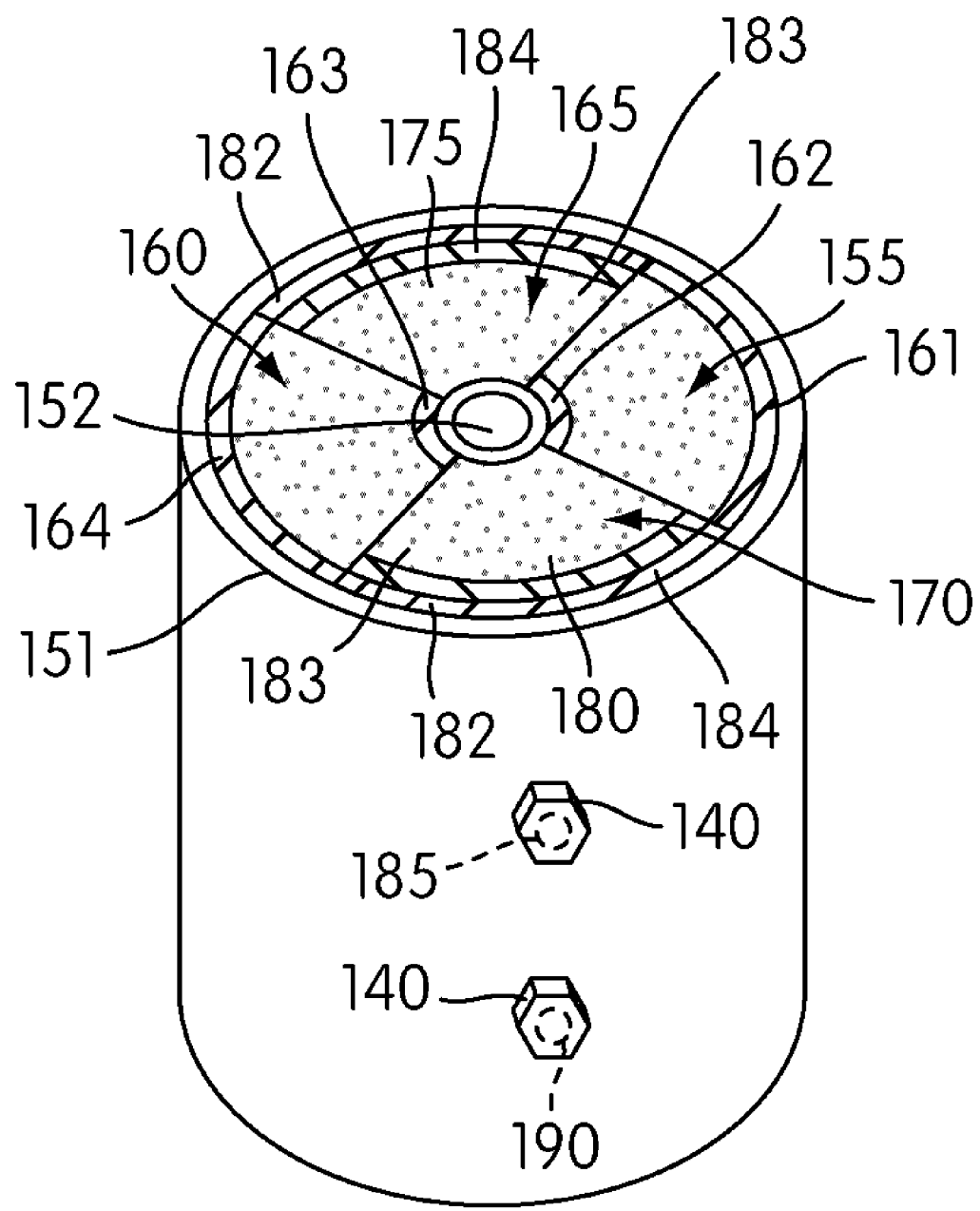
FIG. 6 is an isometric view of an embodiment of an adjustable rate subframe mount with damping inserts disposed in receiving portions.

Generally, as shown in FIGS. 4-6, a subframe mount such as subframe mount 115 includes a housing 151. Housing 151 generally includes an outer portion and an inner cylinder 152 configured to receive a bolt such as bolt 120 shown in FIGS. 2-3. Housing 151 also defines one or more compartments 155, 160, 165, and 170. In this embodiment, housing 151 is generally cylindrical in shape, although subframe 110 may have any shape. Compartments 155, 160, 165, and 170 may have the shape of sections or portions of the shape of housing 151. For example, in this embodiment housing 151 is a cylinder, so compartments 155, 160, 165, and 170 are generally wedge-shaped. In other embodiments, compartments 155, 160, 165, and 170 may have other shapes, such as polygons or circular, conical, or spherical sections.

Some compartments may be filled with a damping material while other compartments may be empty. Inserts such as inserts 175 and 180 as shown in FIGS. 5 and 6, are configured to be positioned within the empty compartments. In some embodiments, such as the embodiment shown in FIGS. 4-6, compartments 155 and 160 are filled with a damping material such as rubber. The damping material may be secured to housing 151, such as with an adhesive layers 161, 162, 163, and 164. Such a configuration allows a designer to hold the rate in one axial direction constant while the rate in the other axial direction is altered. In other embodiments, all compartments may be configured to receive inserts, or the permanently-filled compartments may be aligned with multiple axes.

In the embodiment shown in the figures, housing 151 is divided into four equal compartments 155, 160, 165, and 170. The four compartments may divide substantially all of the interior of housing 151 save for inner cylinder 152. In other embodiments, the number of compartments may be increased or decreased. In other embodiments, the compartments may divide only a portion of the interior of housing 151. Four compartments allows a designer to adjust the rate of subframe 110 in two axes. For example, first compartment 155 and second compartment 160 are positioned opposite to each other along a first axis. Third compartment 165 and fourth compartment 170 are positioned opposite to each other along a second axis.

Each compartment 155, 160, 165, and 170 is configured to receive a removable insert, such as inserts 175 and 180. When all compartments 155, 160, 165, and 170 are configured to receive a removable insert, adjustment tests may be performed in both axial directions simultaneously. Inserts 175 and 180 may be secured within the compartments using any mechanical fastener known in the art. In the embodiment shown in the figures, bolt or screw holes 185 and 190 are provided through housing 151 in each empty compartment. This allows a mechanical fastener such as a bolt 140 to be inserted into inserts 175 and 180 to secure inserts 175 and 180 within their respective compartments 165 and 170. Although bolt holes 185 and 190 and bolts 140 are shown, any mechanical fastener may be used, such as detents, grooves, slides, or the like.

Because the rate of the subframe mount is changed by changing the inserts, the subframe mount system or kit would typically include a plurality or group of inserts, where each insert or subgroup of inserts in the group has a different, known rate. In some embodiments, pairs of inserts having the same rate are provided so that multiple inserts may be used on the same axis, as shown in FIGS. 5 and 6. In some embodiments, at least two inserts or pairs of inserts having different rates are provided, though in other embodiments, more inserts or pairs of inserts having different rates are provided.

FIGS. 7-12 show three different embodiments of inserts 180, 230, and 430 configured to be inserted into the adjustable rate subframe mount. Both inserts generally include a frame 182, 251, 451 and a filler material or materials 183, 235, 240, 435, and 440. In some embodiments, frames 182, 251, 451 are sized and shaped to fit snugly within any of the compartments of housing 151 of any of the subframe mounts 115, 116, 117, 118, such as compartment 170 as shown in FIGS. 4-6. In other embodiments, a particular insert may be sized to fit into the compartments of a specific subframe mount, or into a particular compartment. In other words, the inserts may be keyed to a subframe mount or compartment.

Because, in some embodiments, all of the inserts provided with an adjustable subframe mount system may be interchangeable with each other, frames 182, 251, and 451 may be substantially similarly sized and shaped. Frames 182, 251, and 451 may be made of a rigid and durable material, for example metals such as stainless steel or aluminum. In some embodiments, the material of frames 182, 251, and 451 are the same material as housing 151. In other embodiments, the material of frames 182, 251, and 451 may be made of a deformable material. In some embodiments, frames 182, 251, and 451 may be eliminated from the inserts.

In some embodiments, a damping material 183, 235, 240, 435, and 440 is associated with frames 182, 251, and 451 to define the shape of inserts 180, 230, and 430. Damping material 183, 235, 240, 435, and 440 may be any type of damping material known in the art, such as an elastomeric material. A viscous material may also be used if frames 182, 251, and 451 define a cavity that includes a top portion for sealing (not shown). Any type of damping material may be used.

Figure 7:
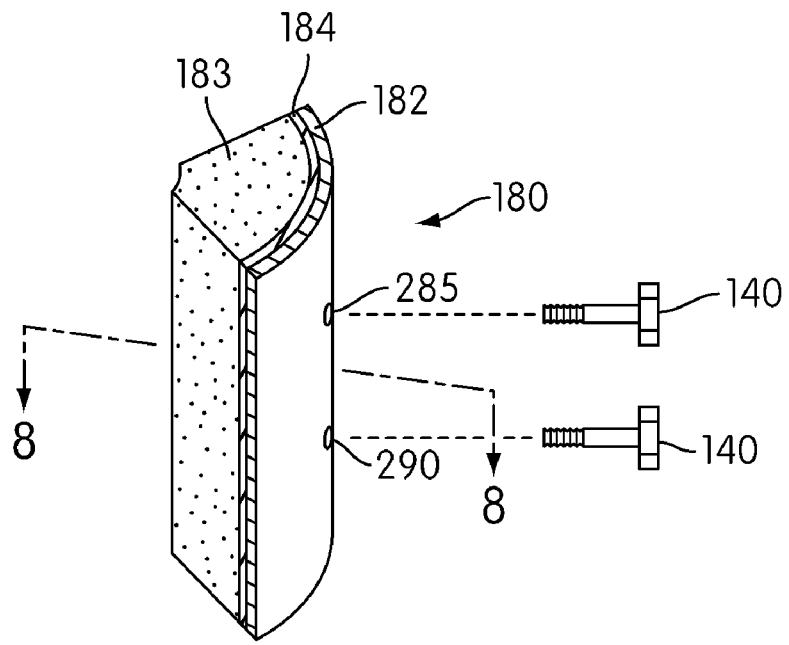
FIG. 7 is an isometric view of an embodiment of a damping insert.
Figure 8:
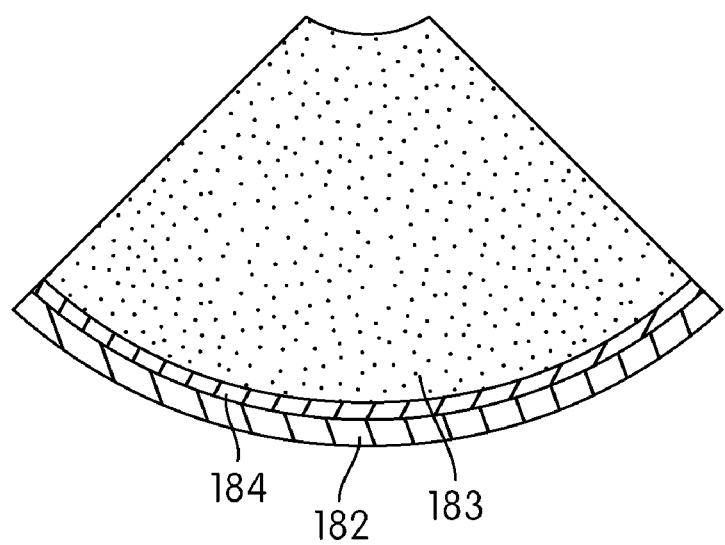
FIG. 8 is a cross-sectional view of the damping insert shown in FIG. 7, taken along line 8-8.

In the embodiment shown in FIGS. 7 and 8, a single damping material 183 is provided within frame 182. Damping material 183 has a known stiffness. This configuration provides a single overall stiffness profile for insert 180.

Figure 9:
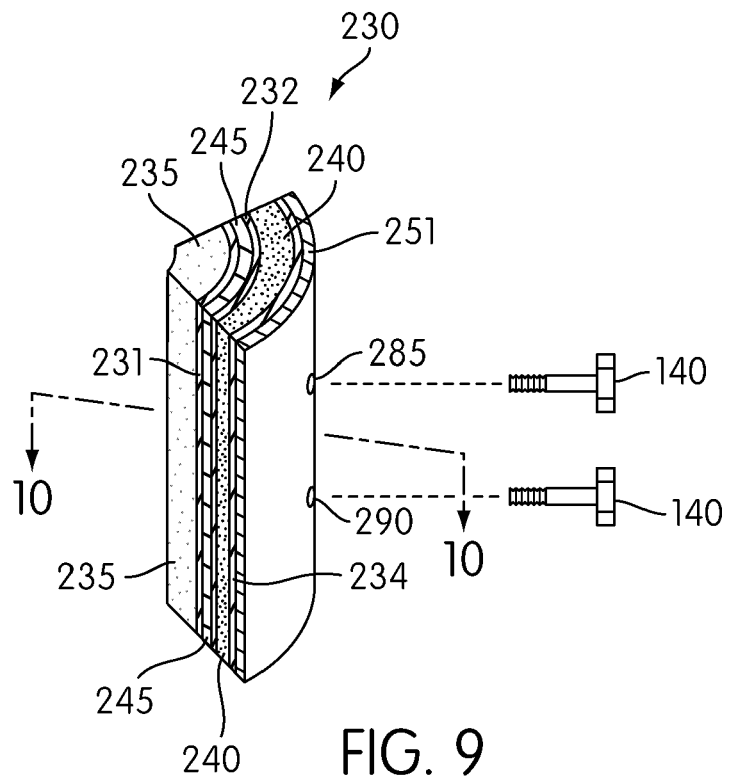
FIG. 9 is an isometric view of an embodiment of a multiple rate damping insert.
Figure 10:
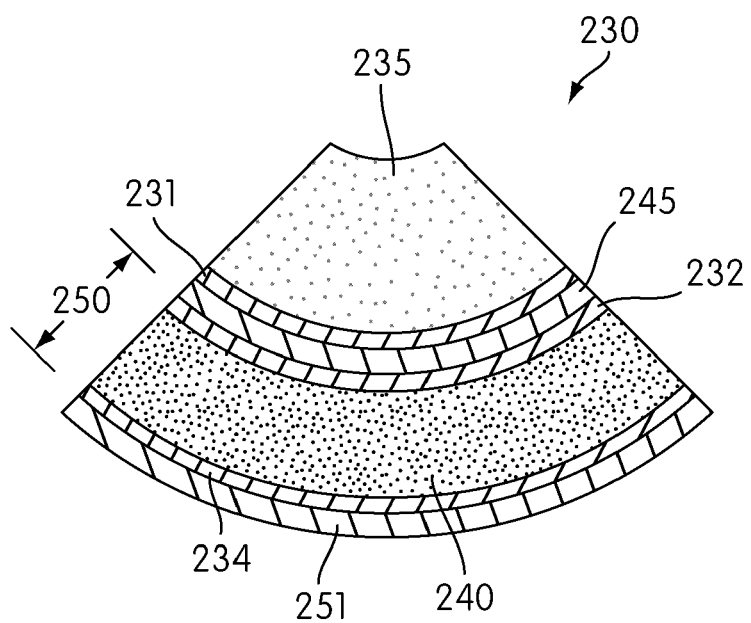
FIG. 10 is a cross-sectional view of the multiple rate damping insert shown in FIG. 9, taken along line 10-10.

Alternatively, in the embodiment shown in FIGS. 9 and 10, two different damping materials 235 and 240 are provided. Each damping material 235 and 240 has a different stiffness. For example, first damping material 235 may be a relatively soft rubber while second damping material 240 may be a relatively hard rubber, or vice versa. This configuration provides a more complex stiffness profile for insert 230. A more complex stiffness profile allows a designer to more finely tune the rate of the subframe mount.

When multiple damping materials are provided in a single insert, the materials may be separated by an optional rate plate 245. Rate plate 245 is a rigid plate, which in some embodiments may be made of the same material as frame 251. Rate plate 245 may be positioned a distance 250 away from an outer wall of housing 251. Rate plate 245 essentially separates insert 230 into two concentric sections. The two sections may be relatively equal in volume or relatively different in volume, depending upon distance 250.

Figure 11:
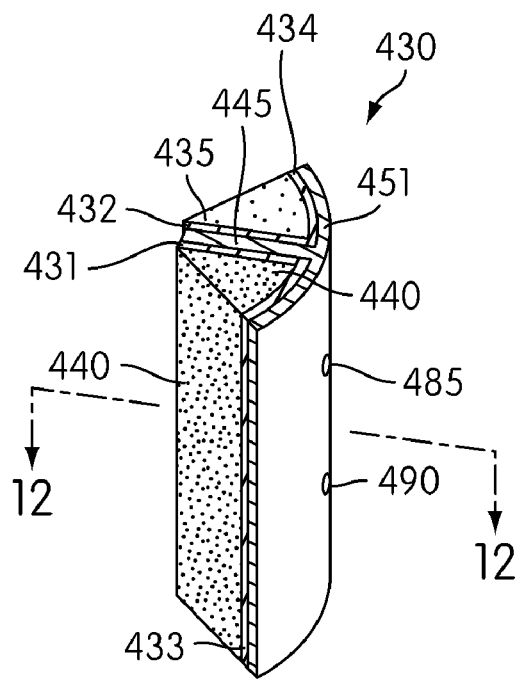
FIG. 11 is an isometric view of an embodiment of a multiple rate damping insert.
Figure 12:
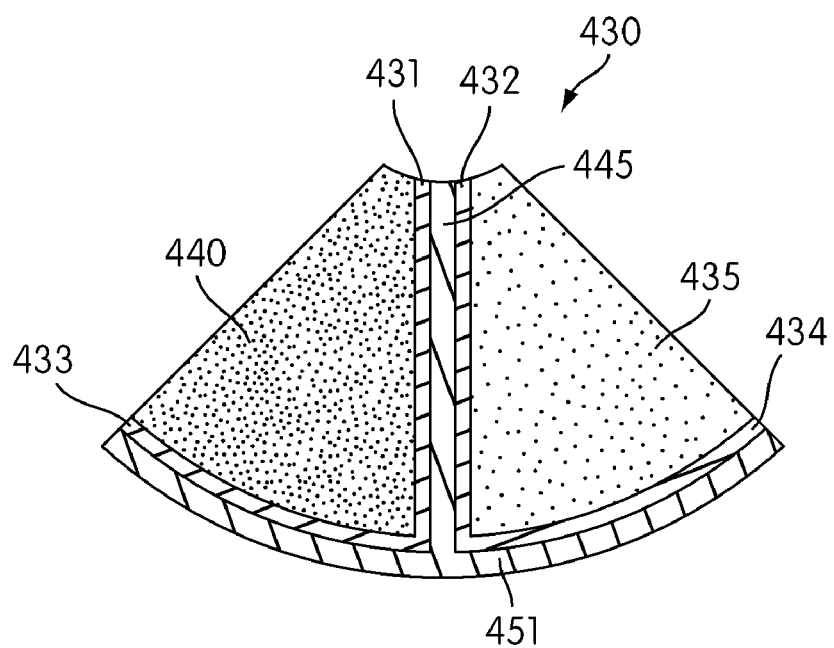
FIG. 12 is a cross-sectional view of the multiple rate damping insert shown in FIG. 11, taken along line 12-12.

In other embodiments, the rate plate may be used to separate insert 230 into side-by-side sections as opposed to concentric sections. FIGS. 11 and 12 show a side-by-side damping insert 430. Frame 451 includes a rate plate 445 that divides frame 451 into two side-by-side sections. A first material 435 having a first stiffness is disposed in one section while a second material 440 having a different stiffness is disposed in the other section. In other embodiments, first material 435 and second material 440 may be the same material. In such embodiments, rate plate 445 may adjust the rate by increasing the stiffness of the insert.

If more than two materials are provided, a rate plate may separate the materials, and at least one rate plate is provided at the interface of any two different materials or sections of material, regardless of whether or not the two sections are the same or different materials.

Rate plate 245 prevents damping materials 235 and 240 from abrading each other during use. Because damping materials 235 and 240 may both be elastomeric materials, such abrasion may eventually degrade or impair the performance of the materials. Additionally, rate plate 245 provides additional stiffness, as the material of rate plate 245 is likely to be more stiff than damping materials 235 and 240.

The damping material may be secured within the frame, such as with an adhesive. For example, as shown in FIGS. 7-8, first damping material 183 is secured to frame 182 with a first adhesive layer 184. In FIGS. 9-10, second damping material 235 is secured to a rate plate 245 with a second adhesive layer 231. A third damping material 240 is secured to rate plate 245 with a third adhesive layer 232 and to frame 251 with a fourth adhesive layer 234. In FIGS. 11-12, a fourth damping material 435 is secured to a rate plate 445 with a fifth adhesive layer 432 and to frame 451 with a sixth adhesive layer 434. A fifth damping material is secured to rate plate 445 with a seventh adhesive layer 431 and to frame 451 with an eighth adhesive layer 433. The adhesive used in any of adhesive layers 184, 231, 232, 234, 431, 432, 433, 434, 445 may be any type of adhesive known in the art, such as glue, UV-cured adhesive, or epoxy.

Each frame 182, 251, and 451 may include provisions to secure inserts 180, 230, and 430, respectively, within a compartment of housing 151. These provisions may correspond to similar provisions provided on housing 151, as discussed above. In the embodiments shown in the figures, bolt holes 285, 290 are provided through frame 182 of insert 180 (FIG. 7) and frame 251 of insert 230 (FIG. 9). Similarly, bolt holes 485 and 490 are provided through frame 451 of insert 430. Bolt holes 285, 290, 485, and 490 may extend into the filler material of the inserts. Bolt holes 285, 290, 485, and 490 are configured to correspond to bolt holes 185 and 190 formed through housing 151. This allows a bolt, pin, or screw to be inserted through both sets of holes, thereby securing inserts 180 and/or 230 within the compartments of housing 151. In some embodiments, the heads of bolts 140 may rest on an exterior surface of housing 151, as shown in FIG. 6. In other embodiments, the heads of bolts 140 may be recessed into housing 151 so that the exterior surface of housing 151 is relatively smooth in the vicinity of bolts 140.

In other embodiments, alternate mechanical or magnetic securing devices may be provided. For example, detents may be provided on frames 182, 251, and 451 that are configured to snap into recesses formed within the compartments of housing 151 or vice versa. Frames 182, 251, and 451 may include a strong magnet that may secure frames 182, 251, and 451 to housing 151 if housing 151 were made of a paramagnetic or oppositely-poled magnetic material. In some embodiments, no securing mechanism may be provided.

FIGS. 2-3 and 13-14 show one embodiment of how adjustable rate subframe mounts may be used to determine an optimal rate during the development process. Generally, for testing purposes, the tester may be provided with a subframe mount system for testing including a plurality of subframe mounts, such as subframe mounts 115, 116, 117, and 118, and a group of inserts having different stiffnesses, such as inserts 180, 230, and 240. Inserts 180, 230, and 240 may be provided in pairs or other multiples so that multiple compartments may be fitted with inserts having the same rate. The tester may then select inserts having a known rate from the group of inserts so that testing may begin. While only subframe mount 115 is discussed, the same procedure may be applied to any of the subframe mounts used to attach subframe 110 to frame 105 and/or engine compartment frame 108.

As discussed above, FIG. 2 shows subframe 110 attached to engine compartment frame 108 using subframe mount 115. Subframe mount 115 is inserted into mount receiving portion 111, and the assembly is connected together using bolt 120, washer 121, and nut 122, similar to the assembly discussed above in FIGS. 2-3. In this assembly, two inserts according to the design of insert 180 are inserted into the empty compartments of subframe mount 115 to form an assembled mount. Inserts 180 are substantially as described above with respect to FIGS. 7 and 8, and have been selected from a group of inserts having known stiffnesses. The group may include any number of inserts, ranging from two to ten or even more. Vibrations tests are performed, and measurements of the vibrations experienced by subframe 110 and engine compartment frame 108 are collected and recorded. A determination is made of whether or not the stiffness profile of mount 115 having inserts 180 is optimal for the motor vehicle being tested.

Figure 13:
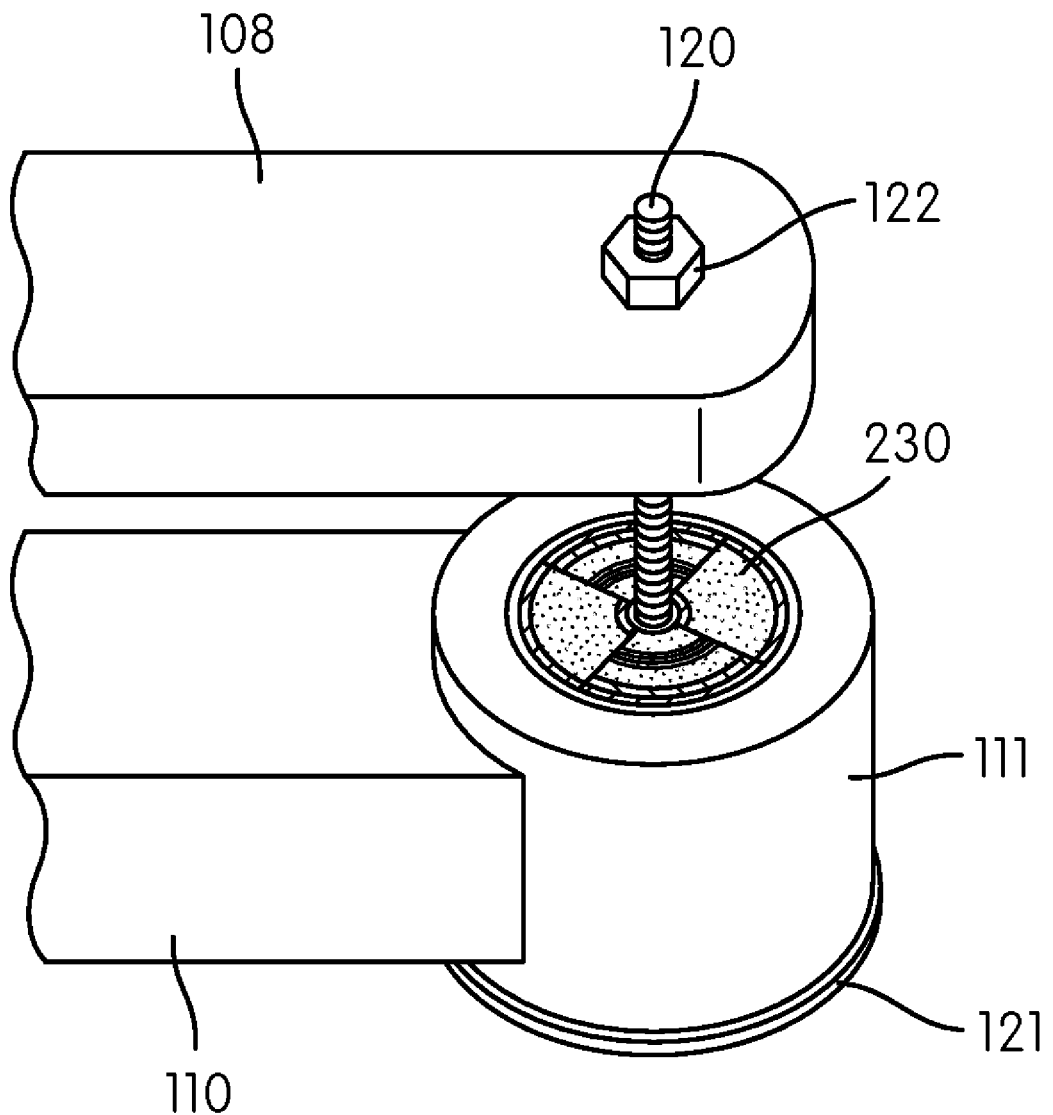
FIG. 13 is an isometric view of a frame, subframe, and subframe mount of with inserts of a particular rate being inserted into the subframe mount.
Figure 14:
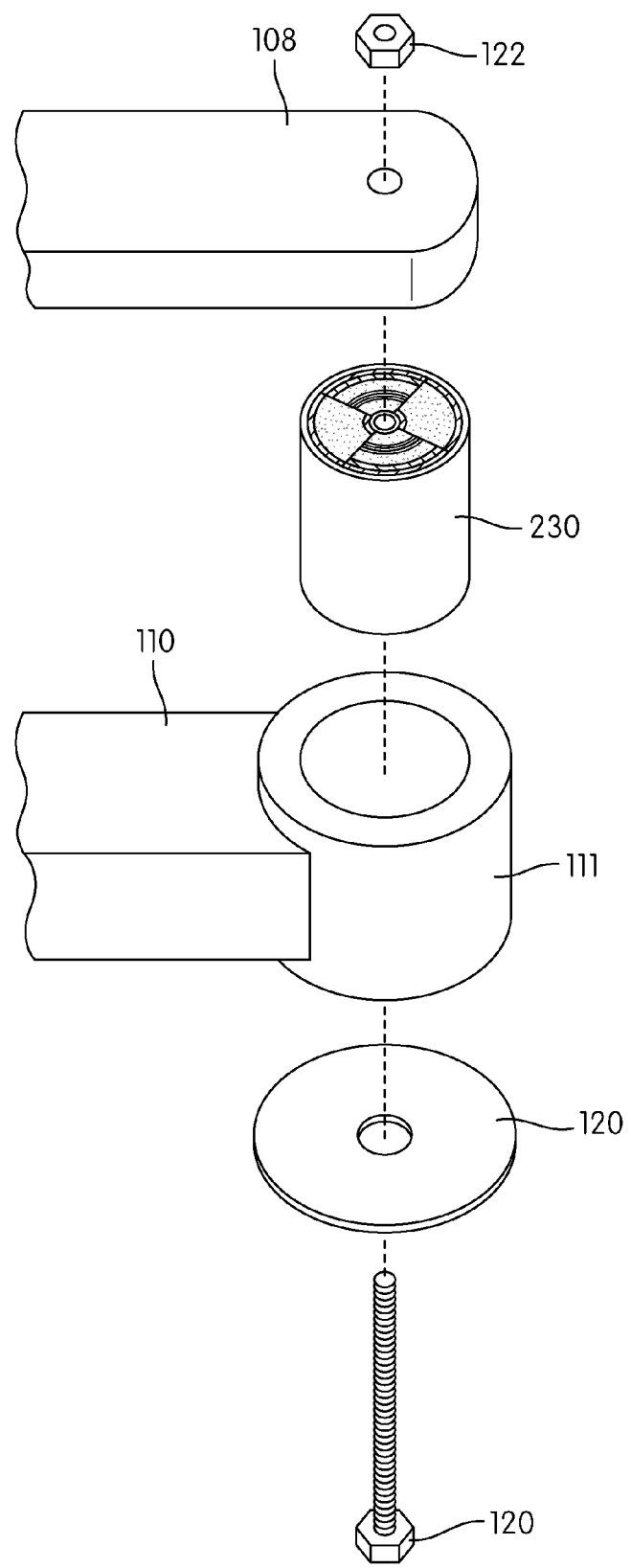
FIG. 14 is an isometric view of the frame, subframe, and subframe mount of FIG. 13 in an assembled condition.

If the stiffness profile of mount 115 having inserts 180 does not produce the desired results, then the assembly shown in FIG. 2 is disassembled as shown in FIG. 3. Inserts 180 are removed, and a new pair of inserts having a different stiffness profile is selected from the group, such as inserts 230. As shown in FIG. 13, inserts 230 are positioned to be inserted into the empty compartments of subframe mount 115 prior to re-attaching subframe 110 to engine compartment frame 108. Subframe mount 115 having inserts 230 will have a new stiffness profile and rate, wherein the new rate is different from the first rate of the mount assembly formed by when inserts 180 were inserted into subframe mount 115. Subframe 110, subframe mount 115, and engine compartment frame 108 are then associated together. For example, as shown in FIG. 14 and described above with respect to FIG. 2, bolt 120 may be pushed through subframe 110, subframe mount 115, and engine compartment frame 108 and secured in position with nut 122. Vibration tests are performed again, and a determination is made as to whether inserts 230 produce the desired response. If so, testing is concluded. If not, the assembly is disassembled, a new set of inserts is selected from the group of inserts, and the process is repeated. The process may be repeated as often as desired by the testers.

The process described above details the testing of vibration response in only one axis. To test a different axis, subframe mount 115 may be removed from mount receiving portion 111 and replaced in a new orientation so that the empty compartments are oriented on another axis. In another embodiment, subframe mount 115 may be provided with four empty compartments, so that both directions may be tested simultaneously with four inserts. It will be apparent to those in the art that various combinations of mounts with different numbers of empty compartments and inserts may be provided to test according to the preferences of the designers.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A subframe mount having a rate, the subframe mount comprising:
   a housing having an outer portion and an inner cylinder spaced from the outer portion;
   at least one compartment provided in the housing and defined by the outer portion and the inner cylinder;
   a first removable insert selected from a plurality of interchangeable inserts each having a shape corresponding to the shape of the at least one compartment, the first removable insert including a first damping material, a second damping material having a different stiffness from the first damping material, a frame disposed along an outer perimeter of the first damping material, and a plate disposed between and coextensive with both the first damping material and the second damping material such that a first side of the plate faces the first damping material and a second side of the plate faces the second damping material; and
   wherein the at least one compartment is configured to receive the first removable insert to adjust the rate of the subframe mount.

2. The subframe mount according to claim 1, further comprising;
   a second removable insert selected from the plurality of interchangeable inserts, wherein the second removable insert is identical to the first removable insert;
   a third removable insert selected from the plurality of interchangeable inserts, the second removable insert having a shape corresponding to the shape of the at least one compartment and including a third damping material that is different from the first damping material and the second damping material;
   a fourth removable insert selected from the plurality of interchangeable inserts, wherein the fourth removable insert is identical to the third removable insert;
   wherein the at least one compartment includes four wedge-shaped compartments evenly dividing the space between the outer portion and the inner cylinder, wherein the four compartments are substantially the same size and shape;
   wherein the first removable insert is disposed within a first compartment of the four compartments, the second removable insert is disposed within a second compartment of the four compartments, the third removable insert is disposed within a third compartment of the four compartments, and the fourth removable insert is disposed within a fourth compartment of the four compartments;
   wherein the first compartment and the second compartment are positioned opposite to each other on an axis; and
   wherein the third compartment and the fourth compartment are positioned opposite to each other on an axis.

3. The subframe mount according to claim 1, wherein the first damping material and the second damping material are both wedge-shaped and wherein the frame is disposed along an outer perimeter of the second damping material, the plate being integral with the frame and being substantially perpendicular to the frame.

4. The subframe mount according to claim 1, wherein the first damping material and the second damping material together form a wedge shape and wherein the plate is disposed along an inner perimeter of the first damping material and along an outer perimeter of the second damping material and the plate separates the first damping material and the second damping material into two concentric sections.

5. A method of optimizing a subframe mount rate, the method comprising:
   providing a subframe mount system comprising a housing including a first compartment and a second compartment having substantially the same size and shape as the first compartment and a group of inserts of various overall stiffnesses each having a size and shape corresponding to the size and shape of the first compartment and the second compartment, wherein the first compartment and the second compartment are configured to removably receive at least one of the group of inserts of various overall stiffnesses;
   associating the housing with a subframe of a motor vehicle;
   selecting a first insert from the group of inserts, the first insert having a first overall stiffness;

positioning the first insert within the housing to form a first assembled subframe mount;

associating the first assembled subframe mount to a motor vehicle frame;

testing the damping effect of the first assembled subframe mount;

detaching the motor vehicle frame from the first assembled subframe mount;

removing the first insert from the housing;

selecting a second insert from the group of inserts, the second insert having a second overall stiffness different from the first overall stiffness; and positioning the second insert within the housing to form a second assembled subframe mount, wherein at least one of the first insert and the second insert has a first damping material having a first stiffness, a second damping material having a second stiffness, a frame disposed along an outer perimeter of the first damping material, and a plate disposed between and coextensive with both the first damping material and the second damping material such that a first side of the plate faces the first damping material and a second side of the plate faces the second damping material.

6. The method according to claim 5, further comprising the step of removably securing the first insert to the housing with a mechanical fastener.

7. The method according to claim 6, wherein the first damping material and the second damping material together form a wedge shape and wherein the first plate is disposed along an inner perimeter of the first damping material and along an outer perimeter of the second damping material and the first plate separates the first damping material and the second damping material into two concentric sections.

8. The method according to claim 5, further comprising the steps of:

attaching the motor vehicle frame to the second assembled subframe mount; and testing the damping effect of the second assembled subframe mount.

9. The method according to claim 5, wherein the first damping material and the second damping material are both wedge-shaped and wherein the frame is disposed along an outer perimeter of the second damping material, the plate being integral with the frame and being substantially perpendicular to the frame.

10. A subframe mounting system for determining the optimal rate of a subframe mount for a motor vehicle, the system comprising:

a housing made of a rigid material and having an outer portion and an inner cylinder spaced from the outer portion;

the housing including a first compartment and a second compartment, the first compartment and the second compartment each defined by the outer portion and the inner cylinder and each configured to receive an insert, the second compartment having substantially the same size and shape as the first compartment; and a group of inserts, wherein each insert of the group of inserts is configured to be removably positioned within at least one of the first compartment and the second compartment, and wherein a first insert in the group of inserts has a stiffness profile that is different from a second insert in the group of inserts, the first insert including a first damping material having a first stiffness, a second damping material having a second stiffness, a frame disposed along an outer perimeter of the first damping material, and a plate disposed between and coextensive with both the first damping material and the second damping material such that a first side of the plate faces the first damping material and a second side of the plate faces the second damping material, wherein a stiffness of the housing is configured to be altered by selecting the first insert from the group of inserts, positioning the selected insert within one of the first compartment and the second compartment, and replacing the first insert with the second insert.

11. The system according to claim 10, wherein the plate is substantially parallel to the frame.

12. The system according to claim 11, wherein the first damping material and the second damping material are each wedge-shaped and the plate extends from the frame.

13. The system according to claim 12, wherein the plate is substantially perpendicular to the frame.

14. The system according to claim 12, wherein the first damping material and the second damping material together form a wedge shape.

15. The system according to claim 11, wherein the plate separates the first damping material and the second damping material into two concentric sections.

16. The system according to claim 10, wherein the second insert comprises a single damping material.

17. The system according to claim 10, wherein the first damping material is disposed between the plate and the frame.

18. The system according to claim 10, wherein the first compartment and the second compartment are each wedge-shaped and are positioned opposite to each other on an axis.

19. A kit for testing the rate of a subframe mount having a housing with at least one compartment defined by an outer portion and an inner cylinder spaced from the outer portion, the compartment configured to receive an insert having a shape corresponding to the shape of the at least one compartment, comprising:

a plurality of interchangeable inserts configured to be received within the at least one compartment of the housing, wherein a first insert of the plurality of interchangeable inserts has a first overall stiffness and a second insert of the plurality of interchangeable inserts has a second overall stiffness, wherein the first insert includes a first damping material having a first stiffness, a second damping material having a second stiffness, a frame disposed along an outer perimeter of the first damping material, and a plate disposed between and coextensive with both the first damping material and the second damping material such that a first side of the plate faces the first damping material and a second side of the plate faces the second damping material.

20. The kit according to claim 19, wherein the first damping material is disposed between the plate and the frame.

21. The kit according to claim 20, wherein the plate separates the first damping material and the second damping material into two concentric sections.

22. The kit according to claim 20, wherein the first damping material and the second damping material together form a wedge shape and the plate separates the first damping material and the second damping material into two wedge shapes.

23. The kit according to claim 19, wherein the plurality of interchangeable inserts includes at least one pair of inserts having substantially the same stiffness.

* * * * *